United States Patent
Stove

(10) Patent No.: US 7,737,881 B2
(45) Date of Patent: Jun. 15, 2010

(54) SIGNAL PROCESSING SYSTEM FOR PULSE-DOPPLER RADAR

(75) Inventor: Andrew Stove, Hove (GB)

(73) Assignee: Thales Holding UK PLC, Weybridge Surrey (GB)

( * ) Notice: Subject to any disclaimer, the term of this patent is extended or adjusted under 35 U.S.C. 154(b) by 137 days.

(21) Appl. No.: 12/176,595

(22) Filed: Jul. 21, 2008

(65) Prior Publication Data

US 2009/0027255 A1    Jan. 29, 2009

(30) Foreign Application Priority Data

Jul. 23, 2007    (GB) .................................. 0714347.2

(51) Int. Cl.
*G01S 13/00* (2006.01)
(52) U.S. Cl. ......................................... 342/93; 342/159
(58) Field of Classification Search ............. 342/89–93, 342/159
See application file for complete search history.

(56) References Cited

U.S. PATENT DOCUMENTS

| | | | | | |
|---|---|---|---|---|---|
| 3,631,486 | A | * | 12/1971 | Anders et al. | 342/91 |
| 3,877,010 | A | * | 4/1975 | Holberg et al. | 342/161 |
| 4,249,177 | A | * | 2/1981 | Chen | 342/93 |
| 4,633,254 | A | * | 12/1986 | Giaccari | 342/91 |
| 4,839,655 | A | * | 6/1989 | Kiuchi | 342/93 |
| 4,963,888 | A | * | 10/1990 | Taylor et al. | 342/90 |
| 4,970,660 | A | * | 11/1990 | Marchant | 702/181 |
| 5,038,145 | A | * | 8/1991 | DeCesare et al. | 342/93 |
| 5,416,488 | A | * | 5/1995 | Grover et al. | 342/159 |
| 6,717,545 | B2 | * | 4/2004 | Dizaji et al. | 342/93 |
| 7,212,150 | B2 | * | 5/2007 | Blunt et al. | 342/91 |

* cited by examiner

*Primary Examiner*—Thomas H Tarcza
*Assistant Examiner*—Peter M Bythrow
(74) *Attorney, Agent, or Firm*—Stroock & Stroock & Lavan LLP

(57) ABSTRACT

A signal processing system for use in pulse-Doppler radar, arranged to receive frequency domain signals for each of a plurality of Doppler bins for each range cell, comprising a data processor arranged successively to threshold each Doppler bin signal under test relative to a local average of signals formed over plural Doppler bins and/or plural ranges adjacent to the Doppler bin under test, using a variable thresholding factor, and using the thresholding result as an indication of the presence of an object of interest; the data processor using a pulse-Doppler constant false alarm rate control process to set and reset the variable thresholding factor using closed loop feedback by counting the indications of presence and incrementing or decrementing the variable thresholding factor for each thresholding result by comparing the frequency of these counts with a predetermined probability of false alarms; whereby the constant false alarm rate thresholding is a function of the range and the Doppler frequency of the range-Doppler bin signal under test.

5 Claims, 3 Drawing Sheets

SIGNAL PROCESSING SYSTEM FOR PULSE-DOPPLER RADAR

This application claims benefit of Great Britain Patent Application 0714347.2, filed Jul. 23, 2007, the entire disclosure of which is incorporated by reference.

This invention relates to a signal processing system for use in pulse-Doppler radar, and in particular to a constant false alarm rate system for reducing the influence of clutter.

Conventional pulse-Doppler radar systems require signal processing in order to reduce clutter which comprises any images which are not of interest to the operator and can constitute false alarms of the presence of a target. Clutter of relevance here includes moving portions of the scene which cause significant returns. The system should also seek to eliminate ghosts of the transmitted signal and other ambiguities.

As is well known, pulse-Doppler radars transmit a series of pulses which are coherent from one to the next. The returns from each pulse are digitised to give one sample in each range cell and for each pulse. The set of pulses corresponding to the returns from a signal range cell over the different transmitted pulses are Fourier transformed so that a series of Doppler bins is produced for each range cell, the signal in a particular range-Doppler bin corresponding to a signal from a target, or a portion of the image scene, at that range and moving with a particular speed. The purpose of this processing is to separate moving targets from slow-moving clutter.

The first stage of the detection process is to calculate a local average signal level, which may be averaged over adjacent ranges but within the same Doppler frequency bin, or it may be averaged over adjacent Doppler frequency bins. If the ratio between the signal level in a particular range and Doppler bin and the average is greater than a predetermined threshold, then a target is declared and this will lead to a blip being formed on a display.

This process of thresholding is known as pulse-Doppler constant false alarm rate processing, or PD-CFAR processing. A problem with existing PD-CFAR systems has been the difficulty experienced by operators in setting the level of the threshold to achieve sufficient sensitivity but to eliminate sufficient clutter. One approach has been to allow an operator to set a threshold multiplier in the central Doppler bins, which generally suffer less clutter than the Doppler bins at the lowest and the highest frequencies; and also to choose one of a series of "profiles" which increase the threshold multiplier in the Doppler bins which are more likely to contain clutter. Other approaches have required blanking those extreme frequency bins completely. However, this approach has been found to be unsatisfactory particularly with low pulse repetition frequencies and relatively few Doppler cells, and this problem has been particularly acute for sea clutter in airborne radar.

Accordingly, the purpose of the present invention is to improve the signal processing in pulse Doppler radar systems in order to enhance sensitivity and eliminate more clutter.

Embodiments of the invention provide a signal processing system for use in pulse-Doppler radar, arranged to receive frequency domain signals for each of a plurality of Doppler bins for each range cell, comprising a data processor arranged successively to threshold each Doppler bin signal under test relative to a local average of signals formed over plural Doppler bins and/or plural ranges adjacent to the Doppler bin under test, using a variable thresholding factor, and using the thresholding result as an indication of the presence of an object of interest; the data processor using a pulse-Doppler constant false alarm rate control process to set and reset the variable thresholding factor using closed loop feedback by counting the indications of presence and incrementing or decrementing the variable thresholding factor for each thresholding result by comparing the frequency of these counts with a predetermined probability of false alarms; whereby the constant false alarm rate thresholding is a function of the range and the Doppler frequency of the range-Doppler bin signal under test.

Preferably, the system is arranged to receive and separately to process the frequency domain signals for each angular range in azimuth of a multiplicity of angular ranges, whereby the constant false alarm rate thresholding is also a function of azimuthal angle.

In order that the invention may be better understood, a preferred embodiment will now be described, by way of example only, with reference to the accompanying drawings, in which.

Figure 4:
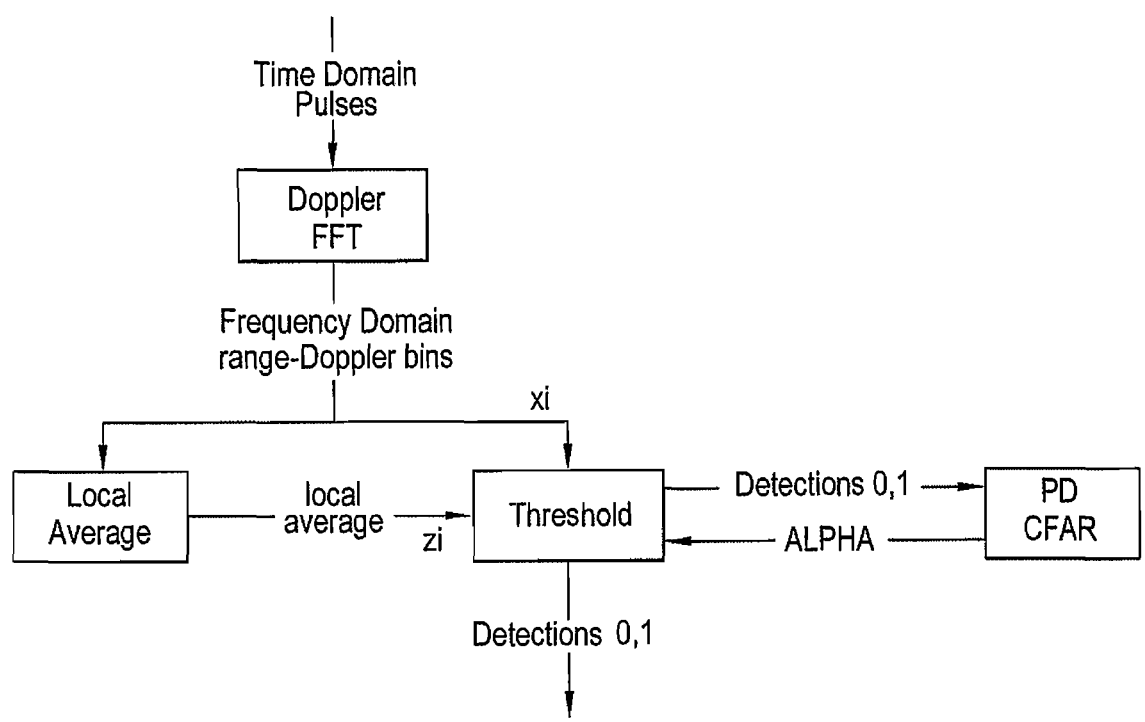
FIG. 4 is a schematic diagram of a signal processing system embodying the present invention.
Figure 5:
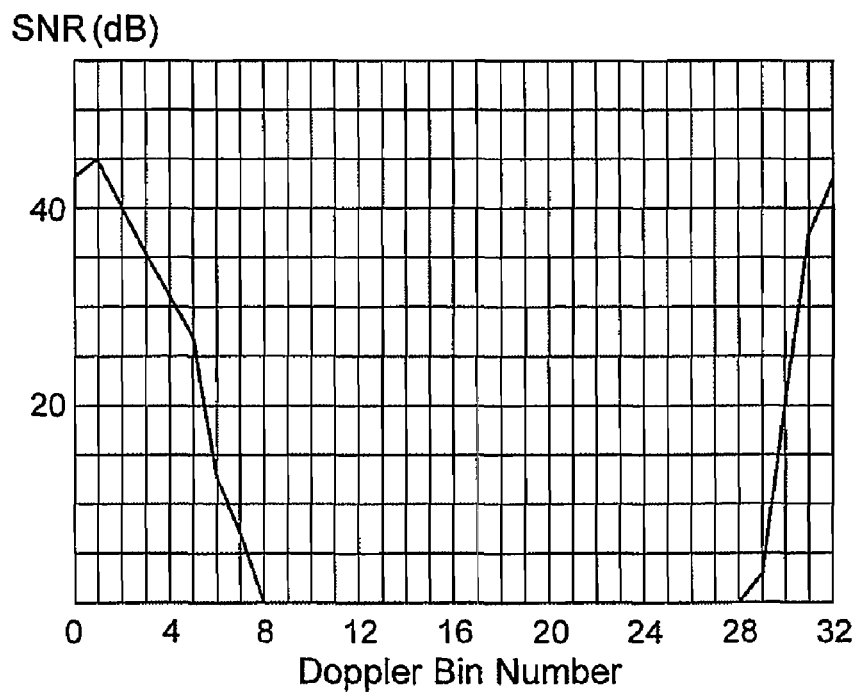
Figure 6:
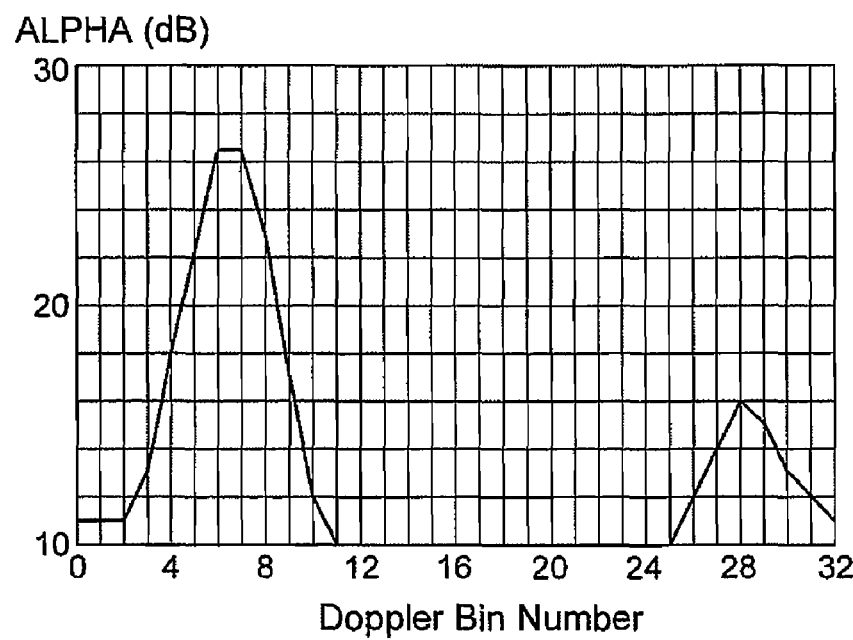

FIG. 5 is a graph showing signal to noise ratio against Doppler bin number illustrating actual clutter power for a typical scene, averaged over all the range bins; and FIG. 6 is a graph showing the variable thresholding factor ALPHA plotted against Doppler bin number for the observation of a scene at sea observed at one particular range of azimuthal angles, in accordance with the embodiment shown in FIG. 4.

Figure 1:
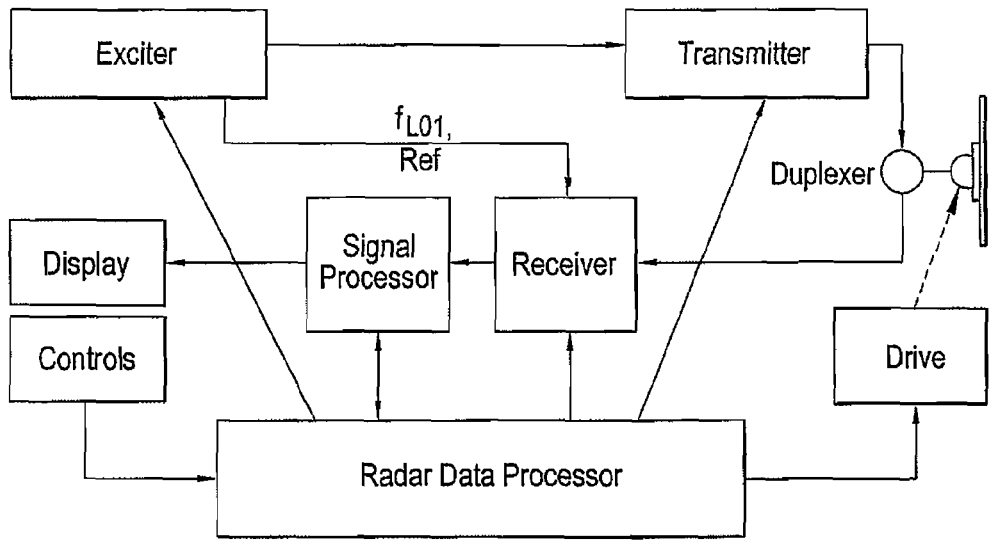
FIG. 1 is a schematic diagram of a conventional pulse Doppler radar system.
Figure 2:
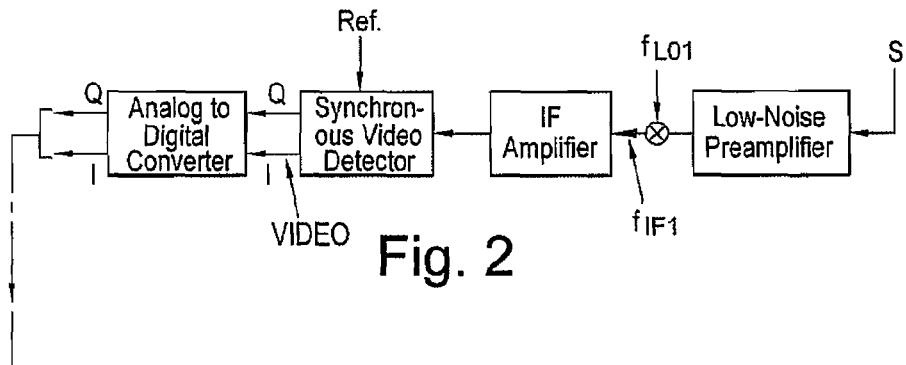
FIG. 2 is a schematic diagram of the receiver of the radar system of FIG. 1.

A conventional pulse Doppler radar system will first be described with reference to FIGS. 1 to 3 of the accompanying drawings. An exciter generates a continuous, highly stable, low power signal of a frequency which is selectable over a wide range by an operator, and of the desired phase, for the transmitter; the exciter also generates, precisely offset from the transmitter signal, a local oscillator signal LO1 and a reference frequency signal Ref. for the receiver. Both the transmitter and the receiver are connected by way of a duplexer to a planar array antenna whose orientation and configuration is controlled by a drive mechanism receiving control signals from a radar data processor. The radar data processor receives control signals from operator controls, and also receives output signals from a signal processor shown in more detail in FIG. 3. The radar data processor has outputs to the exciter, transmitter, receiver and signal processor. The signal processor provides an output to a display adjacent the operator.

The transmitter is typically a high power amplifier of the type known as a gridded travelling-wave tube. The transmitter is keyed on and off to cut coherent pulses from the exciter's signal and it amplifies these pulses to the desired power level for transmission. The width and pulse repetition frequency of the transmitted pulses are capable of modification under the control of the radar data processor. Similarly, the exciter's low power signal may be modified by the radar data processor, so as to change or modulate the frequency, phase and power level of the high power pulses, or to code them for pulse compression. The receiver receives a signal S from the duplexer through a receiver protection device, and, as shown in FIG. 2, it comprises a low noise preamplifier upstream of a mixer. The mixer receives the local oscillator signal at frequency $f_{LO1}$ to produce an intermediate frequency signal at $f_{IF1}$ which is fed to an IF amplifier.

A synchronous video detector receives the reference signal Ref. from the exciter and the output of the second IF amplifier, to generate video frequency signals I,Q (in phase, quadrature) which are fed to an analog to digital converter. This beats the Doppler shifted received return signals against the reference signal and produces the bipolar video outputs whose amplitudes are sampled at intervals of the order of a pulse width. The output of the analog to digital converter is numerical and is supplied to the signal processor which is shown in greater detail in FIG. 3.

Figure 3:
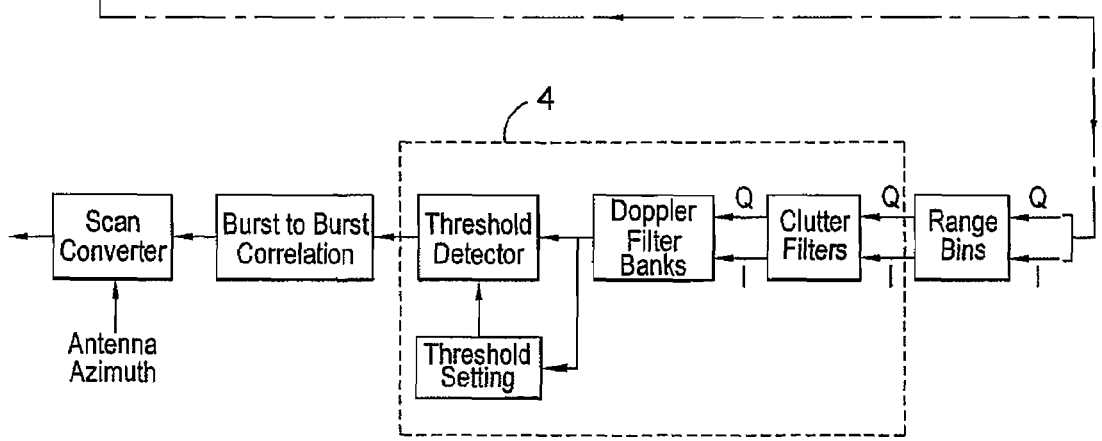
FIG. 3 is a schematic diagram of the signal processor of the system of FIG. 1.

The signal processor of FIG. 3 sorts the incoming digital signals into range bins in accordance with their time of arrival, storing the numbers in range bins; it also filters out the bulk of unwanted ground clutter or sea clutter on the basis of Doppler frequency. A set of Doppler filter banks sorts signals into each range increment by their Doppler frequency. The processor integrates the energy of successive echoes from the same target, i.e. echoes which have the same Doppler frequency, to reduce still further the background of noise and clutter. This is performed by a threshold detector which operates on a variable threshold setting using a closed loop feedback arrangement as shown. The system processor temporarily stores the positions of the targets in memory. It continuously scans its memory at a rapid rate and provides the operator with a continuous bright video display of the positions of all targets, using digital scan conversion in a scan converter. The scan converter receives a signal from the data processor indicating the current angle in azimuth of the antenna, so that the display represents moving targets in a two-dimensional scene taking account of both range and azimuthal angle.

Between the threshold detector and the scan converter is a block for executing burst to burst correlation. This reduces the false alarm rate. It allows the CFAR to run at a false alarm rate high enough for the false alarm rate to be estimated with adequate accuracy and relatively fast, while allowing the displayed false alarm rate to be much lower, i.e. low enough to be acceptable to the operator.

An embodiment of the invention will now be described with reference to FIGS. 4 to 6. A signal processing system corresponding to the clutter filters, Doppler filter banks and threshold detector and threshold setting components labelled 4 in FIG. 3, is shown in FIG. 4. A Doppler fast Fourier transform unit Doppler FFT receives digital signals representing time domain pulses, and converts them into the frequency domain so that they represent range-Doppler bins, i.e. Doppler frequency bins for each of several ranges. Each range-Doppler bin signal $x_i$, referred to as the Doppler bin signal under test, is fed to a local average processor and also to a thresholding processor for pulse Doppler constant false alarm rate thresholding, the output of which thresholding is a binary indicator indicative of the presence of or absence of an object of interest, i.e. a target.

A local average processor calculates a local average signal level which, in this example, is taken from the same Doppler bin but over adjacent ranges. The local average $z_i$ is fed to the threshold processor which receives a threshold multiplier ALPHA from the pulse Doppler constant false alarm rate processor or PD CFAR. The threshold processor compares the local average $z_i$ with the Doppler bin signal $x_i$ under test in accordance with the current variable value of the threshold multiplier ALPHA, and outputs the binary result 0 or 1 dependent upon the result of the comparison. The threshold processor may for example multiply $x_i$ by ALPHA and compare it with $z_i$.

Thus if the ratio between the signal level in a particular range and Doppler bin and the average is greater than a predetermined threshold then a target is declared. The PD CFAR processor receives the binary output of the threshold processor and stores a count of these detection values. The PD CFAR also receives a signal representing the required probability $P_{fa}$ of pulse alarms, which could typically be of the order of $10^{-6}$. A thresholding processor in the PD CFAR receives the count and the required $P_{fa}$ and determines whether the threshold multiplier ALPHA should be incremented or decremented in order to converge to the required $P_{fa}$; the PD CFAR then applies the appropriate predetermined amount of increment or decrement in accordance with the thresholding result, and feeds back the threshold multiplier ALPHA to the threshold processor. In this way, the sensitivity of the PD CFAR system is adjusted iteratively to converge onto a required probability $P_{fa}$.

In accordance with embodiments of the present invention, it is significant that the PD CFAR operates on individual range-Doppler bins. This leads to a significant improvement over previous PD CFAR arrangements.

Since the characteristics of sea clutter vary significantly with azimuthal angle, it is a preferred feature of embodiments of the present invention to process the range-Doppler bins in discrete angular ranges of azimuth. These azimuthal ranges or angular cells are preferably of equal size, and for example there may be twelve angular cells each of 30°. In a typical pulse Doppler radar, there may for example be of the order of ten or twenty Doppler cells. By carrying out the PD CFAR as shown with reference to FIG. 4 separately for each angular cell, the elimination of clutter and the identification of true targets at sea is significantly enhanced.

FIG. 5 illustrates actual clutter power in terms of signal to noise ratio in dB, for each different Doppler frequency bin, in a typical scene at sea, averaged over all the range bins. To illustrate the performance of the preferred embodiment of the invention, FIG. 6 illustrates the way in which the PD CFAR system sets the threshold multiplier ALPHA, for each of the different Doppler frequency bins. The graph shown in FIG. 6 corresponds to just one angular azimuthal range, i.e. one angular cell, as the radar scans around. The graph varies significantly from angular cell to cell. The tails of the Doppler frequency, i.e. the lowest and the highest Doppler frequencies, require the highest threshold multipliers, as shown by the two peaks in FIG. 6. This markedly asymmetric distribution will occupy different Doppler bins corresponding to different resolved clutter velocities when the sea is observed from different directions as the radar scans.

During each dwell, the radar preferably transmits a number of separate bursts of pulses, each at a different pulse repetition frequency and, incidentally, at a different carrier frequency. This difference in pulse repetition frequencies allows the range ambiguities to be resolved; by requiring typically three detections in the same unambiguous range cell over the typically six pulse repetition frequencies, this also greatly reduces the pulse alarm rate. This means that the detections at the individual pulse repetition frequencies, which are counted by the PD CFAR system, are much more frequent than the displayed false alarms. This in turn allows a reasonable number, for example ten, of false alarms to be counted in each angular Doppler cell over say ten scans of the radar, while having a much lower false alarm rate shown on the display. Ten false alarms is about the minimum necessary to provide a meaningful estimate of the false alarm rate. A low pass filter, executed in software, in the feedback loop in the PD CFAR performs this averaging. For a slow-moving platform such as a helicopter, this is sufficiently fast to allow the system to adapt as the radar platform manoeuvers.

Another preferred feature of the signal processing system is the summation of false alarms in a particular Doppler bin over all the pulse repetition frequencies, even though that bin corresponds to a significantly different velocity range for each pulse repetition frequency. It has been found in practice that the advantage of having more data to obtain a better estimate of the false alarm rate more quickly, more than compensates for the reduced accuracy of that estimate due to the overlapping of the Doppler bins.

It will be understood that the invention may be implemented in many different ways from that shown in the embodiment of FIG. 4. It may be implemented predominantly in computer software. The output may be displayed in real time or it may be stored and subsequently processed, depending upon the particular requirements. The PD CFAR system may respond to the different values of the angular cells and to the different ways in which local averaging is undertaken, either by operator input or by automatic response to other parts of the signal processing system or of the overall pulse Doppler radar apparatus. The computation performed by the threshold processor could be done in many different ways, not necessarily involving multiplication by a threshold multiplier, provided that there is some form of variable threshold which is adjusted iteratively in the feedback loop.

The invention claimed is:

1. A signal processing system for use in pulse-Doppler radar, arranged to receive frequency domain signals for each of a plurality of Doppler bins for each range cell, comprising a data processor arranged successively to threshold each Doppler bin signal under test relative to a local average of signals formed over plural Doppler bins and/or plural ranges adjacent to the Doppler bin under test, using a variable thresholding factor, and using a thresholding result as an indication of a presence of an object of interest; the data processor using a pulse-Doppler constant false alarm rate control process to set and reset the variable thresholding factor using closed loop feedback by counting the indications of presence and incrementing or decrementing the variable thresholding factor for each thresholding result by comparing a frequency of these counts with a predetermined probability of false alarms; whereby a constant false alarm rate thresholding is a function of the range and the Doppler frequency of the range-Doppler bin signal under test.

2. The signal processing system according to claim 1, arranged to receive and separately to process the frequency domain signals for at least a portion of each angular range in azimuth of a plurality of angular ranges, whereby the constant false alarm rate thresholding is also a function of azimuthal angle.

3. The signal processing system according to claim 1, wherein the local average is an average of the signals formed over plural ranges adjacent the range of the range-Doppler bin under test.

4. The signal processing system according to claim 1, in which the data processor is also responsive to the number of signals over which the averaging has been performed, in order to set and reset the variable thresholding factor.

5. Pulse-Doppler radar apparatus comprising: a receiver for providing digital video return signals; a signal processing system according to claim 1 for processing the return signals into range bins and Doppler frequency bins and thresholding out clutter; and a display responsive to scan-converted image signals produced by the signal processing system in response to the indications of presence.

* * * * *